United States Patent [19]

Sumitomo

[11] 4,216,825
[45] Aug. 12, 1980

[54] PLATE TYPE EVAPORATOR

[75] Inventor: Hiroyuki Sumitomo, Amagaski, Japan

[73] Assignee: Hisaka Works, Ltd., Osaka, Japan

[21] Appl. No.: 906,873

[22] Filed: May 17, 1978

[30] Foreign Application Priority Data

May 17, 1977 [JP] Japan .................................. 52-57343

[51] Int. Cl.³ .............................................. F28F 13/12
[52] U.S. Cl. ................................. 165/109 R; 165/166; 165/DIG. 11; 159/28 P
[58] Field of Search ............... 165/DIG. 11, 109, 133, 165/166, 167, 164; 159/28 P

[56] References Cited

U.S. PATENT DOCUMENTS

| | | | |
|---|---|---|---|
| 4,108,242 | 8/1978 | Searight et al. | 165/DIG. 11 X |
| 4,159,739 | 7/1979 | Brothers | 165/133 |

FOREIGN PATENT DOCUMENTS 2143155  3/1972  Fed. Rep. of Germany .......... 165/164

Primary Examiner—Albert W. Davis
Assistant Examiner—Margaret A. Focarino
Attorney, Agent, or Firm—Armstrong, Nikaido, Marmelstein & Kubovcik

[57] ABSTRACT

A plate type evaporator having heat transfer surfaces with which jets of liquid collide. Each heat transfer surface is formed with a number of grooves arranged in concentric circles with their common center located at the center of collision. Such grooves, on the boiling heat transfer surfaces, function to promote the formation of nuclei, while on the heating heat transfer surfaces, they act to cause turbulent flow to the heating medium in that they constitute points of contacts where they are contacted with the bottoms of the grooves of an adjacent heat transfer plate.

5 Claims, 5 Drawing Figures

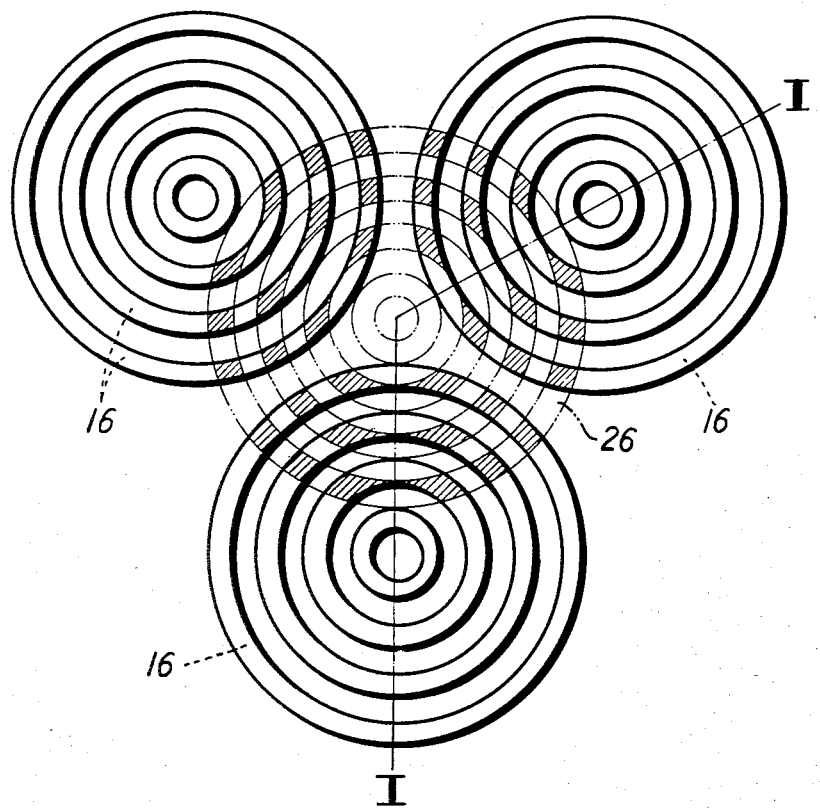
Fig_3_

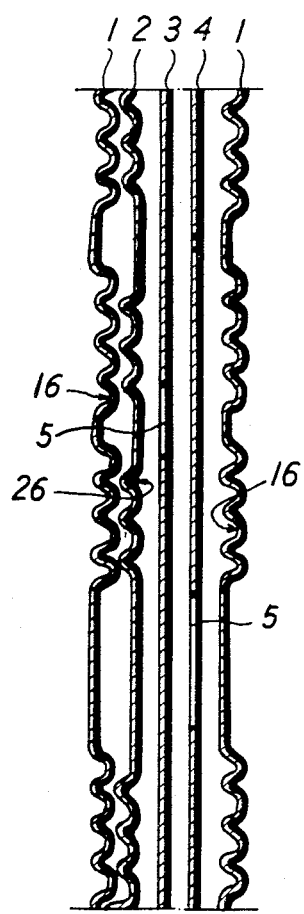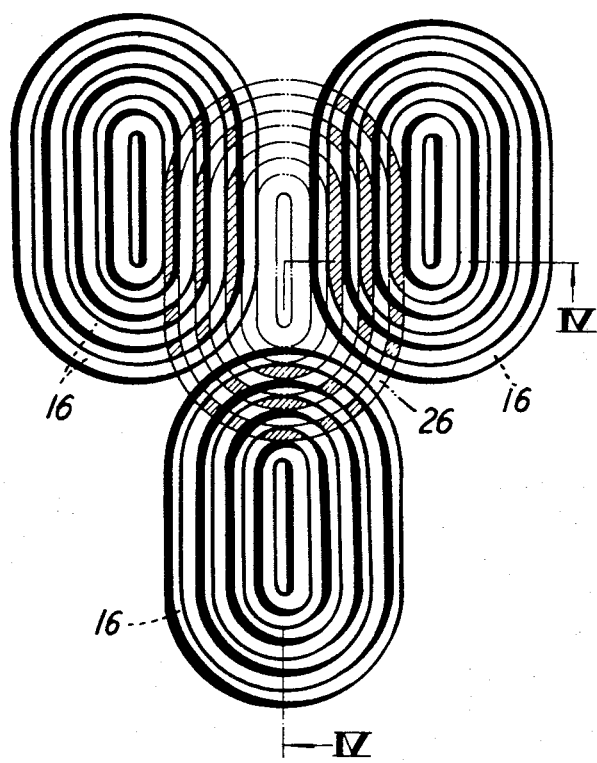

PLATE TYPE EVAPORATOR

BACKGROUND OF THE INVENTION (a) Field of the Invention

The present invention relates to a plate type evaporator having a novel heat transfer surface construction, and more particularly it relates to a collision jet type plate evaporator.

(b) Description of the Prior Art

The plate type evaporator is designed so that the liquid to be evaporated is heat-exchanged with the heating medium through a heat transfer plate and thereby evaporated, with the transfer of heat effected while the liquid is boiling on the heat transfer surface.

When boiling starts inside a saturated liquid, vapor is generated with the particles of dust and air contained in the liquid serving as nuclei. When the so-called pool boiling inside a stationary liquid is considered, it is seen that bubbles of vapor are continuously generated until the temperature difference between the heat transfer surface and the saturated liquid reaches a certain value. The points of generation of bubbles of vapor on the heat transfer surface are called the boiling nuclei, and such boiling state is called nucleate boiling. Concerning the generation of bubbles of vapor, it is known that very small recesses on the heat transfer surface which act to suck the air contained in the liquid serve as cavities for the formation of nuclei, and that, therefore, satisfactory boiling heat transfer could be achieved by deliberately forming very small cavities on the heat transfer surface.

Processing the heat transfer surface for such purpose on an industrial scale, however, would be difficult. Therefore, a collision jet type plate evaporator in which a liquid to be evaporated is jetted onto the heat transfer surface to disturb the liquid on the heat transfer surface so as to promote boiling heat transfer, has already been proposed by me (e.g., U.S. Patent application Ser. No. 868,749). This comprises heat transfer plates, and jet plates formed with small holes, the arrangement being such that a first fluid, e.g., a liquid to be evaporated, is jetted through the small holes of the jet plates to collide with heat transfer surfaces of the heat transfer plates opposed thereto for heat exchange with a second fluid, e.g., a heating medium, flowing along the rear surfaces of said heat transfer plates, whereby the liquid is evaporated.

In the collision jet type, however, in the case of a flat plate, bubbles can hardly be generated in the vicinity of the points of collision of jets because of the successive supply of supercooled liquid to be evaporated. Even if they are generated, the disturbing action of the jets produces a kind of bubbling phenomenon, impeding the flow of the liquid or the bubbles remain unseparated from the liquid, lowering the heat transfer rate, only to form a losing factor in the case of nucleate boiling.

SUMMARY OF THE INVENTION

The present invention is intended to provide a collision jet type plate evaporator characterized by a novel heat transfer surface construction capable of promoting nucleate boiling. According to the invention, each of the heat tranfer surfaces with which jets of liquid collide is formed with a number of grooves arranged, e.g., in concentric circles, quasi-circles, volute convolutions or squares, with their common center located at the center of collision.

FEATRUES OF THE INVENTION

Grooving the heat transfer surfaces results in this, that on the boiling heat transfer surfaces, the liquid flow becomes a turbulent flow, promoting nucleate boiling while on the heating heat transfer surfaces, the grooves in each heat transfer surface are contacted with the bottoms of the grooves of an adjacent heat transfer surface to constitute points of contact, which function to cause turbulent flow to the heating medium. Therefore, a high heat transfer rate is assured on both high and low temperature sides. Thus, an evaporator which has a superior performance on the whole is obtained.

BRIEF DESCRIPTION OF THE DRAWINGS

FIG. 3 is a diagrammatic front view of principal portions of heat transfer plates, illustrating the arrangement of promoting grooves;

FIG. 4 is a sectional view of a system of plates put together, taken along the line IV—IV of FIG. 5, showing another embodiment of the invention; and FIG. 5 is a diagrammatic front view of principal portions of heat transfer plates, illustrating the arrangement of promoting grooves.

DESCRIPTION OF THE PREFERRED EMBODIMENTS

Figure 1:
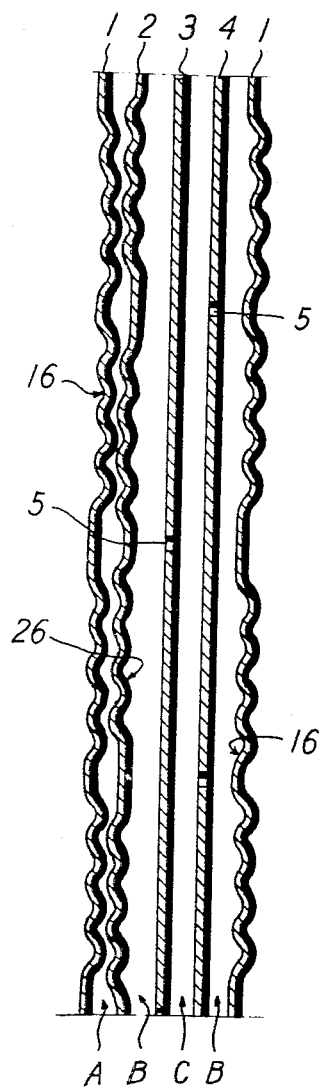
FIG. 1 is a sectional view of a system of plates put together, taken along the line I—I of FIG. 3, showing an embodiment of the present invention.

Referring to FIG. 1 showing the cross section of a system of plates put together, the numerals 1 and 2 designate heat transfer plates; and 3 and 4 designate jet plates. The jet plates 3 and 4 each have circular jet holes 5 formed at required places for jetting a liquid to be evaporated. Such plates are put together in large numbers in the order shown, to form the principal portion of the evaporator. More particularly, a heating space A into which a heating medium is fed is defined between the heat transfer plates 1 and 2; a vapor space B into which a liquid to be evaporated is defined between the heat transfer plate 2 and the jet plate 3; and a feed space C into which the liquid to be evaporated is fed is defined between the jet plates 3 and 4. Further, defined between the jet plate 4 and a heat transfer plate 1 included in an adjacent system of plates is a vapor space B as in the case of the space between said heat transfer plate 2 and jet plate 3. The vapor spaces B and feed space C communicate with each other through jet holes 5.

The heat transfer plates 1 and 2 have a number of grooves 16 and 26, respectively, arranged in concentric circles, with their common center located at the center of collision against which the liquid to be evaporated is jetted through each jet hole 5. These grooves 16 and 26 may be easily obtained by forming them integrally with the heat transfer plates 1 and 2 as by press work.

Figure 2:
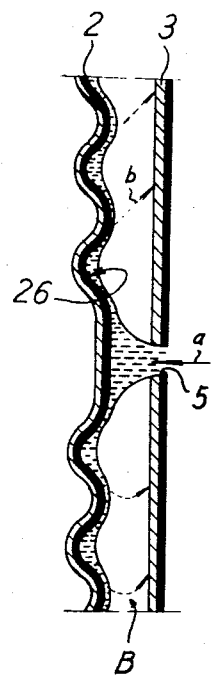
FIG. 2 is an enlarged view showing a principal portion of FIG. 1.

FIG. 2 is an enlarged view of a portion of FIG. 1 for explanation of the function of the grooves. First, concerning the boiling heat transfer surfaces, the jet of liquid to be evaporated which is emitted in the direction of arrow a through the jet hole 5 flows on the heat transfer plate 2, crossing the grooves 26 and spreading toward the outer periphery. The grooves 26 then function to promote the formation of nuclei necessary for nucleate boiling, generating a number of bubbles of vapor at the grooves 26. The rest of the liquid successively spreads to outer grooves while the bubbles of vapor generated at each groove 26 are separated from the liquid as indicated by a dotted line arrow b before they reach the next adjacent groove. The vapor thus generated is taken out through a vapor exit (not shown) located, e.g., at the upper region of the vapor space B.

As described above, the grooves 16 and 26 promote the formation of nuclei to increase the amount of bubbles of vapor per unit time on the boiling heat transfer surfaces and prevent the generated bubbles of vapor from flowing into the next adjacent groove while assuming the so-called two-phase flow state in which they are mixed with liquid, thereby greatly accelerating boiling heat transfer.

On the heating heat transfer surfaces, the grooves act as means for causing turbulent flow to the heating medium. More particularly, as shown in FIG. 3, the grooves 16 in the heat transfer plate 1 and the grooves 26 in the heat transfer plate 2 are arranged so that their centers are displaced from each other, whereby the grooves 16 and 26 are locally contacted with each other at their bottoms to constitute points of contact (indicated by shading in FIG. 3). These points of contact serve to disturb the flow of heating medium in the heating space A, thereby increasing the heat transfer rate.

FIGS. 4 and 5 show another embodiment of the invention. Jet holes 5 are formed in jet plates 3 and 4, said holes being in the form of elongated slits, and corresponding thereto, heat transfer plates 1 and 2 are formed with a number of oval grooves 16 and 26, respectively, extending longitudinally of said jet holes 5. In the case of the jet holes 5 in the form of slits, the amount of jets of liquid to be evaporated is increased, so that the treatment of large amounts is possible. Further, in the case of boring a number of small holes, several or tens of small holes would be required in order to obtain an area of opening equal to that of a single slit, relatively increasing the number of processing steps and the processing cost. In the case of the treatment of large amounts, slit-like jet holes 5 are advantageous.

In addition, the plane contour of the grooves is not limited to a circle and oval, as shown in FIGS. 3 and 5, but it may be a quasi-circle, volute, square, etc.

Obviously, the invention is not limited to the particular embodiments described and shown herein and various modifications may be made without departing from the spirit and scope of the invention.

What is claimed is:

1. A plate type evaporator characterized in that in a collision jet type plate evaporator: (a) the heat transfer surfaces of the heat transfer plates are formed with a number of grooves which are concentric with the center of collision with which a jet collides; (b) jet holes in the jet plates are circular; and (c) the plane contour of the grooves in the heat transfer plates is circular.

2. A plate type evaporator characterized in that in a collision jet type plate evaporator: (a) the heat transfer surfaces of the heat transfer plates are formed with a number of grooves which are concentric with the center of collision with which a jet collides; (b) jet holes in the jet plates are elongated slits; and (c) the plane contour of the grooves in the heat transfer plates is an oval extending correspondingly to said jet holes.

3. A plate type evaporator characterized in that in a jet collision type plate evaporator, the heat transfer surfaces of the heat transfer plates with which jets collide are each formed with a number of grooves concentric with the center of collision and that on two adjacent heat transfer plates, the centers of said grooves are displaced from each other.

4. A plate type evaporator as set forth in claim 3, characterized in that the jet holes in the jet plates are circular and that the plane contour of the grooves in the heat transfer plates is circular.

5. A plate type evaporator as set forth in claim 3, characterized in that the jet holes in the jet plates are elongated slits and that the plane contour of the grooves in the heat transfer plates is an oval extending correspondingly to said jet holes.

* * * * *